United States Patent
Omori et al.

(10) Patent No.: US 6,246,039 B1
(45) Date of Patent: Jun. 12, 2001

(54) HIGH FREQUENCY HEATING APPARATUS HAVING A WAVE GUIDE INTRODUCING MICROWAVES INTO HEATING CHAMBER

(75) Inventors: Yoshiharu Omori; Katsuaki Hayami, both of Otsu (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/506,089

(22) Filed: Feb. 17, 2000

(30) Foreign Application Priority Data

Feb. 19, 1999 (JP) .................................................. 11-041572

(51) Int. Cl.[7] .................................................. H05B 6/70
(52) U.S. Cl. .......................... 219/746; 219/748; 219/695
(58) Field of Search .................................. 219/746, 748, 219/749, 695, 696

(56) References Cited

U.S. PATENT DOCUMENTS

| | | | |
|---|---|---|---|
| 2,827,537 | * 3/1958 | Haagensen | 219/746 |
| 3,806,689 | * 4/1974 | Kegereis et al. | 219/746 |
| 5,825,000 | * 10/1998 | Jun | 219/746 |
| 5,948,310 | * 9/1999 | Shon et al. | 219/746 |
| 6,008,483 | * 12/1999 | McKee et al. | 219/748 |
| 6,066,841 | * 5/2000 | Kim et al. | 219/746 |

FOREIGN PATENT DOCUMENTS

| | | |
|---|---|---|
| 8-17569 | 1/1996 | (JP) . |
| 9-320756 | 12/1997 | (JP) . |
| 10-205770 | 8/1998 | (JP) . |

* cited by examiner

*Primary Examiner*—Philip H. Leung
(74) *Attorney, Agent, or Firm*—Armstrong, Westerman, Hattori, McLeland & Naughton, LLP

(57) ABSTRACT

The microwave oven is provided with a magnetron and a wave guide. The wave guide is formed by a combining portion and a matching portion. The magnetron is provided with a magnetron antenna, and the magnetron antenna projects into the combining portion. The combining portion has one end connected to the matching portion, and has a structure in which the cross-sectional area does not change in the horizontal direction. The matching portion has a structure in which its cross-sectional area increases toward the side surface of a heating chamber. An antenna is provided on a mica board in the portion connecting a matching portion with another matching portion.

11 Claims, 10 Drawing Sheets

HIGH FREQUENCY HEATING APPARATUS HAVING A WAVE GUIDE INTRODUCING MICROWAVES INTO HEATING CHAMBER

BACKGROUND OF THE INVENTION

1. Field of the Invention

The present invention relates to a high frequency heating apparatus such as a microwave oven, and more specifically to a high frequency heating apparatus for heating an object to be heated inside a heating chamber by a magnetron or the like.

2. Description of the Background Art

A microwave oven is a typical example of a high frequency heating apparatus.

FIG. 12 shows a first prior art example. A microwave oven 100 shown in FIG. 12 is provided with a magnetron 101, a wave guide 102, and a heating chamber 103. Magnetron 101 is provided with a magnetron antenna 101A. Magnetron antenna 101A projects into wave guide 102. Wave guide 102 connects magnetron 101 and heating chamber 103. The microwaves generated in magnetron 101 are introduced into heating chamber 103 via wave guide 102.

Wave guide 102 is conventionally formed as a casing whose dimension does not change in the horizontal direction. As a result, it is difficult to match the impedances of magnetron 101 and heating chamber 103. Consequently, a high ratio of the microwaves generated in the magnetron is reflected toward the magnetron in a microwave oven as the one shown in FIG. 12, which leads to the problem of the heating efficiency of magnetron being poor.

FIG. 13 shows a second prior art example. A microwave oven 200 shown in FIG. 13 is provided with a magnetron 201, a wave guide 202, and a heating chamber 203. Magnetron 201 is provided with a magnetron antenna 201A. Magnetron antenna 201A projects into wave guide 202. In addition, wave guide 202 is provided with a metal plate 210 for controlling the direction of radiation of the microwaves generated in magnetron 201 to a desired direction. Metal plate 210 is rotatable by a movable member such as a motor, not shown.

A lower light surface of wave guide 202 has a slope. Thus, the area of the vertical cross section of wave guide 202 gradually increases in the direction of the microwave propagation, i. e. from magnetron 201 toward heating chamber 203. As a result, the impedances between a magnetron and a heating chamber can be matched more easily in the microwave oven shown in FIG. 13 than in the microwave oven shown in FIG. 12, and the heating efficiency can be improved in the microwave oven shown in FIG. 13.

In the microwave oven shown in FIG. 13, however, the cross-sectional area in the above-mentioned direction changes substantially throughout the entire wave guide 202. The positional relation between magnetron 201 and wave guide 202 would thus greatly affect the above-described impedance matching. In other words, an error in mounting position of magnetron 201 would affect the heating capabilities of the microwave oven, which leads to the problem of unstable heating efficiency in the microwave oven shown in FIG. 13.

Moreover, metal plate 210 made rotatable by a movable member is provided in the microwave oven shown in FIG. 13. It may be preferable to match the impedances of the magnetron and the heating chamber by providing a movable member like metal plate 210 and by moving this movable member in an appropriate manner.

A movable member in general, however, has by comparison a more complicated structure than a non-movable member that is simply mounted so that the possibility of malfunctioning is greater in the former. Therefore, the provision of a movable member for the purpose of impedance matching in a microwave oven may, instead, create a new problem of unstable heating capabilities of the microwave oven due to the malfunction of the member.

On the other hand, some conventional microwave ovens provide the microwaves into the heating chamber from one side surface of the heating chamber as shown in FIGS. 12 and 13, while other conventional microwave ovens provide the microwaves into the heating chamber from the top surface and the bottom surface of the heating chamber. FIG. 14 shows a third prior art example.

A microwave oven 300 is provided with a heating chamber 303, magnetrons 301 and 304 for heating an object to be heated 316 inside heating chamber 303 by generating the microwaves, and wave guides 302 and 305 for introducing into heating chamber 303 the microwaves generated by magnetrons 301 and 304, respectively. Radiation apertures 313 and 319 are respectively provided on the top and the bottom of heating chamber 303, and the microwaves guided through wave guides 302 and 305 are provided to heating chamber 303 via the respective radiation apertures 313 and 309. In addition, a turntable on which the object to be heated is to be placed is denoted by 314, and a turntable motor for rotating turntable 314 is denoted by 315 in the drawing.

Turntable 314 is preferably made of a microwave-permeable material (such as glass) alone. It, however, is normally difficult to form the turntable only of a material such as glass due to considerations of mechanical strength and mechanical connection to be established with turntable motor 315. Thus, turntable 314 in a conventional microwave oven is formed by a combination of a metallic receiving base and a plate made of glass or the like. More specifically, turntable 314 is formed by a metallic receiving base connected to turntable motor 315 and a plate made of glass or the like placed on the metallic receiving base.

The microwaves are reflected by metal. In a microwave oven as the one shown in FIG. 14, the microwaves irradiated on a portion where a hole width of the metallic receiving base provided at the bottom of turntable 314 is not more than $\lambda/2$ ($\lambda$ is a wavelength of the microwave) are reflected by the receiving base so that the microwaves are not absorbed by object to be heated 316. In other words, in the microwave oven as the one shown in FIG. 14, there exist in the region on turntable 314 a region which absorbs from the lower side the microwaves irradiated from below turntable 314 and a region which does not absorb the microwaves.

As a result, the amount of the microwaves absorbed by the object to be heated greatly varies even with the same heating time, depending on the position at which the object to be heated is placed on turntable 314 in the microwave oven shown in FIG. 14. In short, the same problem of unstable heating capabilities occurs in the microwave oven shown in FIG. 14.

SUMMARY OF THE INVENTION

Thus, the present invention was conceived in view of such problems. One object of the present invention is to provide a high frequency heating apparatus having good heating efficiency and stable heating capabilities.

Another object of the present invention is to ensure the impedance matching between a high frequency heating portion and a heating chamber.

According to one aspect of the present invention, a high frequency heating apparatus includes a heating chamber for accommodating an object to be heated, a high frequency heating portion for generating microwaves to heat the object to be heated, and a wave guide for introducing into the heating chamber the microwaves generated by the high frequency heating portion. The wave guide includes a first portion and a second portion. The first portion of the wave guide is a portion that has one end connected to the high frequency heating portion and in which impedance with regard to microwave propagation does not change. Moreover, the second portion of the wave guide is a portion that is connected to the other end of the first portion and to the heating chamber and in which impedance with regard to microwave propagation changes from impedance close to that of the first portion to impedance close to that of the heating chamber.

Therefore, according to the high frequency heating apparatus of the present invention, the high frequency heating portion is connected to the first portion in which the impedance of the wave guide does not change, and the wave guide has the second portion in which the impedance matching can be effected between the high frequency heating portion and the heating chamber.

Since the high frequency heating portion is connected to the first portion, the heating capabilities of the high frequency heating apparatus is not affected even when the mounting position of the high frequency heating portion is somewhat shifted out of place. In addition, since the impedance matching can be effected in the second portion, the ratio of the microwaves generated in the high frequency heating portion and reflected toward the high frequency heating portion in the high frequency heating apparatus can be reduced. Thus, stable heating capabilities as well as an improved heating efficiency can be achieved in the high frequency heating apparatus.

Moreover, the second portion is preferably formed by a plurality of tubes.

Thus, the degree of freedom in designing the shape of the second portion is improved so that the impedance matching can be effected between the high frequency heating portion and the heating chamber with greater certainty.

As a result, the heating efficiency in the high frequency heating apparatus can be improved more easily.

Preferably, a portion of the second portion connected to the chamber has a tapering shape.

Thus, the impedance matching can be effected between the high frequency heating portion and the heating chamber while limiting the lengthwise dimension in the second portion.

As a result, the high frequency heating apparatus can be made more compact.

Preferably, a metal antenna is provided at a portion, in the wave guide, where the rate of change in cross-sectional area of the wave guide in the direction of microwave propagation changes.

Thus, with the metal antenna, the impedance matching is effected within the wave guide in the portion where the rate of change in cross-sectional area of the wave guide in the direction of microwave propagation changes. As a result, the impedance matching can be effected between the high frequency heating portion and the heating chamber with greater certainty.

Preferably, a metal antenna is provided in every portion in which the rate of change in cross-sectional area of the wave guide in the direction of microwave propagation changes.

Thus, with the metal antenna, the impedance matching is effected in every portion in which the rate of change in cross-sectional area of the wave guide in the direction of microwave propagation changes. As a result, the impedance matching can be effected between the high frequency heating portion and the heating chamber with greater certainty.

Preferably, the metal antenna is formed with a single piece of metal.

Thus, the impedance matching can be effected between the high frequency heating portion and the heating chamber with greater certainty.

Preferably, the metal antenna is mounted such that it does not make contact with the wave guide.

Thus, the impedance matching can be effected between the high frequency heating portion and the heating chamber with greater certainty.

Preferably, the metal antenna has a portion conforming to the direction of microwave propagation and a portion crossing the direction of microwave propagation.

Consequently, the metal antenna is formed to possess a portion that conforms to the direction of microwave propagation and a portion that is bent in relation to the direction of propagation. With a bent provided in the metal antenna, the impedance with regard to microwave propagation can be changed within the wave guide in the portion where the metal antenna is bent. Thus, the impedance matching can be effected between the high frequency heating portion and the heating chamber with greater certainty.

Preferably, the metal antenna has a portion where its cross-sectional area changes.

Consequently, the cross-sectional area of the metal antenna changes in the direction of the microwave propagation. Thus, the change in impedance with regard to the microwave propagation is effected by this change in the cross-sectional area. As a result, the impedance matching can be effected between the high frequency heating portion and the heating chamber with greater certainty.

Preferably, the metal antenna is present in every plane crossing the direction of microwave propagation in the wave guide.

Thus, even when a plurality of metal antennas are employed, the plurality of antennas are coupled with regard to microwave propagation in the direction of microwave propagation.

According to another aspect of the present invention, a high frequency heating apparatus includes a heating chamber for accommodating an object to be heated, a circular heating plate on which the object to be heated is to be placed, a receiving base for supporting and driving the heating plate, and a high frequency heating portion for heating the object to be heated. The heating plate is provided in the heating chamber and is formed by a dielectric. The receiving base is formed of metal. The high frequency heating portion heats the object to be heated by allowing microwaves to permeate from below the receiving base. The receiving base has a plurality of windows. The plurality of windows are each formed radially from the center toward the outer periphery of the receiving base. Each of the plurality of windows has a dimension of 5 centimeters at maximum in the direction perpendicular to the radial direction of the receiving base.

With the high frequency heating apparatus according to the present invention, when the high frequency heating portion allows the microwaves to permeate from below the receiving base, the heating plate would have no region that extends longer than 5 centimeters that can absorb the microwaves in the direction perpendicular to the radius of the receiving base. It is understood that a dish or a container for containing food or liquid as a typical example of an object to be heated has a bottom surface with a radius that is longer than 5 centimeters.

Thus, a typical object to be heated would be placed across both a region that can absorb the microwaves and a region that cannot absorb the microwaves on the heating plate in the direction perpendicular to the radius of the receiving base. In other words, a typical object to be heated is not placed in the microwave-absorbing region alone on the heating plate in the direction perpendicular to the radius of the receiving base. Therefore, it may be assumed always to be the case that a typical object to be heated is placed not only in the microwave-absorbing region but also in the region that cannot absorb the microwaves. Thus, the microwave absorption ratio can be approximated for substantially all of the objects to be heated. As a result, stable heating capabilities can be achieved in the high frequency heating apparatus.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The embodiments of the present invention will be described below in relation to the drawings.

First Embodiment

Figure 1:
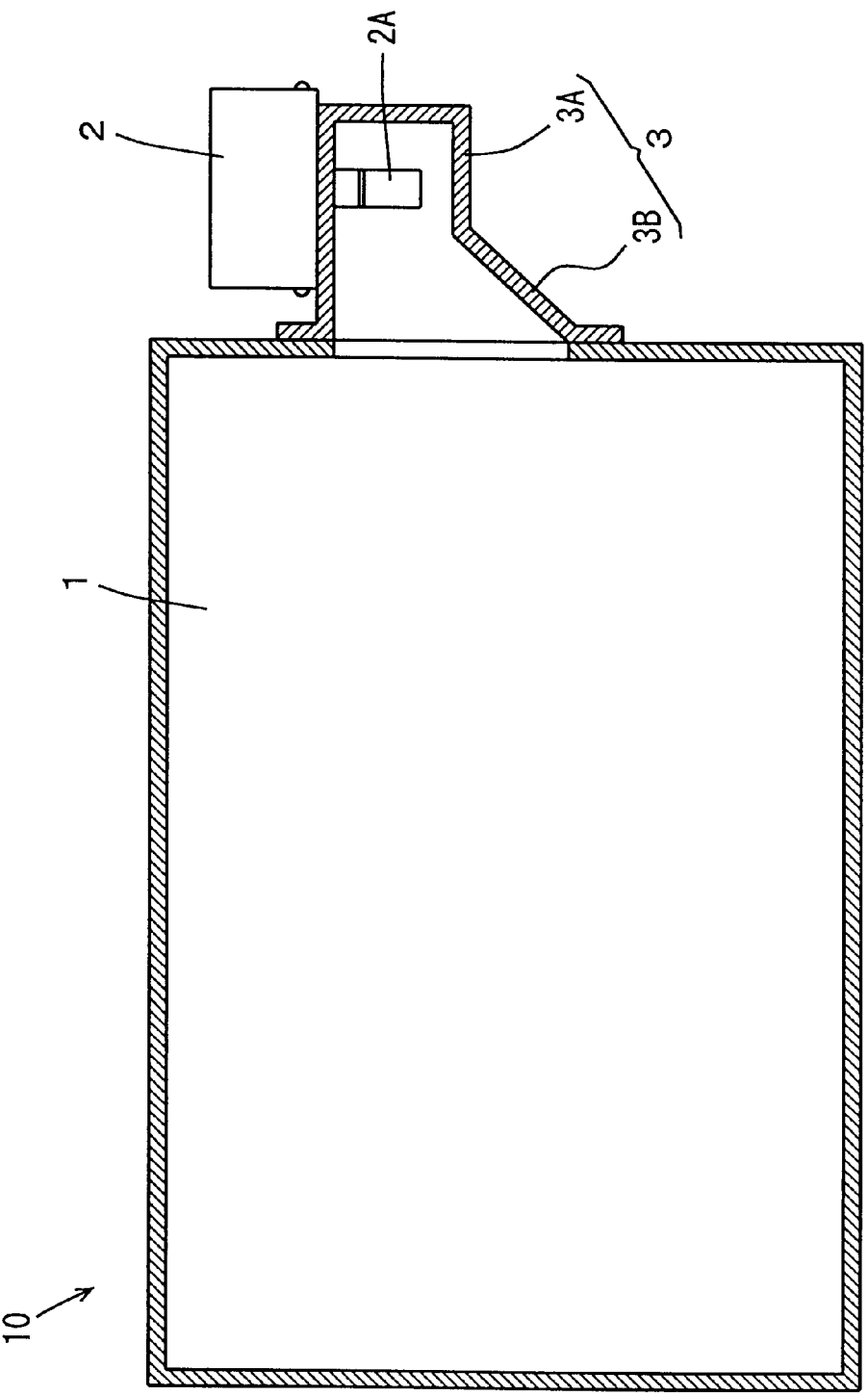
FIG. 1 is a diagram showing a microwave oven of a first embodiment of the present invention.

As shown in FIG. 1, a microwave oven 10 is provided with a heating chamber 1, a magnetron 2, and a wave guide 3. An object to be heated such as food and the like accommodated in heating chamber 1 is heated by the microwaves irradiated by magnetron 2. Magnetron 2 is provided with an antenna 2A. Wave guide 3 includes a combining portion 3A and matching portion 3B.

Combining portion 3A is a hollow body extending in the horizontal direction and having a constant area of cross section in planes parallel to the depth-wise direction and to the vertical direction of the drawing. Matching portion 3B is a hollow body that extends in the horizontal direction with its bottom surface having a slope. Thus, in matching portion 3B, the area of the cross section in planes parallel to the depth-wise direction and to the vertical direction of the drawing increases toward the left. Combining portion 3A is connected to one side of matching portion 3B, and the other side of matching portion 3B is connected to a side surface of heating chamber 1. Magnetron 2 is connected to the upper portion of wave guide 3, and magnetron antenna 2A protrudes into combining portion 3A of wave guide 3.

Matching portion 3B serves to effect the impedance matching between heating chamber 1 and combining portion 3A in which magnetron antenna 2A exists. Thus, the reflection of the microwaves generated by magnetron 2 toward magnetron 2 can be limited in microwave oven 10. As a result, the heating efficiency in microwave oven 10 can be improved.

In addition, since combining portion 3A has a configuration in which its area of cross section in planes parallel to the depth-wise direction and to the vertical direction of the drawing remains the same, the relation of impedance between heating chamber 1 and the region where magnetron antenna 2A exists (combining portion 3A) does not change even when the mounting position of magnetron 2 is somewhat shifted out of place toward the left side or the right side of the drawing. Thus, the heating efficiency of microwave oven 10 is not affected by the mounting position of magnetron 2 being somewhat shifted out of place.

In other words, the heating capabilities and the heating efficiency of microwave oven 10 can be improved by providing wave guide 3 with combining portion 3A and matching portion 3B.

Now, the configuration in the vicinity of wave guide 3 in microwave oven 10 will be described in further detail.

Microwave oven 10 is provided with a fan for cooling magnetron 2. Wave guide 3 is provided with a duct for sending the wind created by the fan successfully to magnetron 2. Further, magnetron 2 is provided with a terminal for connecting magnetron 2 to a power source. The duct is provided with a high voltage line holding portion in which a high voltage line extending from the terminal is fitted. The fan, the duct, and the terminal are not shown in FIG. 1.

In the above-described embodiment of the present invention, combining portion 3A forms the first portion of the wave guide having one end connected to the high frequency heating portion and in which impedance with regard to microwave propagation does not change. Moreover, matching portion 3B forms the second portion of the wave guide that is connected to the other end of the first portion and to the heating chamber. In this second portion, from the portion connected to the first portion (combining portion 3A) toward the portion connected to the heating chamber, the impedance with regard to microwave propagation changes from the impedance close to that of the first portion to the impedance close to that of the heating chamber.

Second Embodiment

Figure 2:
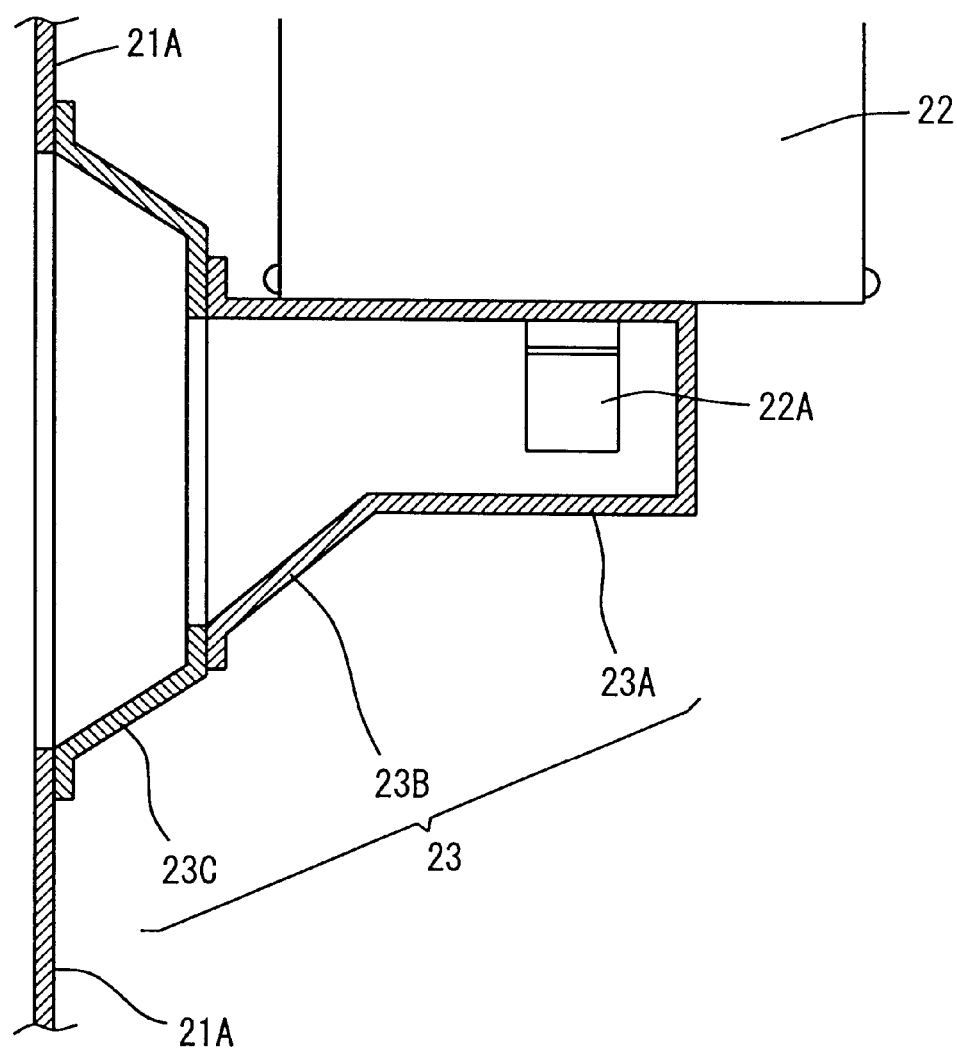
FIGS. 2 and 3 are diagrams showing the magnetrons and wave guides in microwave ovens of second and third embodiments of the present invention, respectively.

As shown in FIG. 2, the microwave oven according to the present embodiment is provided with a magnetron 22 and a wave guide 23.

Wave guide 23 has a combining portion 23A, and matching portions 23B and 23C. Combining portion 23A and matching portion 23B have the same structure as combining portion 3A and matching portion 3B described in relation to FIG. 1, respectively. Matching portion 23C is a tube having a tapering shape.

Magnetron 22 is mounted on wave guide 23. Magnetron 22 has a magnetron antenna 22A. Magnetron antenna 22A protrudes into combining portion 23A. Combining portion 23A is connected to one end of matching portion 23B. The other end of matching portion 23B is connected to an end, having a smaller diameter, of matching portion 23C. The end having a larger diameter of matching portion 23C is connected to a side surface 21A of the heating chamber of the microwave oven.

In the microwave oven according to the present embodiment, wave guide 23 is shaped such that matching portion 23C is further connected to wave guide 3 described in relation to FIG. 1 on the heater chamber side. While matching portion 23C has a tapering shape as described above, in such a tapering shape, the end having a smaller diameter has a diameter that is substantially the same as the other end of matching portion 23B, and the end having a larger diameter has a diameter larger than the other end of matching portion 23B. Therefore, in the microwave oven according to the present embodiment, the impedance matching between the heating chamber and combining portion 23A in which magnetron antenna 22A resides can be effected in two stages, i. e. by matching portion 23B and matching portion 23C. As a result, the heating efficiency of the microwave oven according to the present embodiment can be improved more easily than that of the microwave oven according to the first embodiment described in relation to FIG. 1.

Third Embodiment

Figure 3:
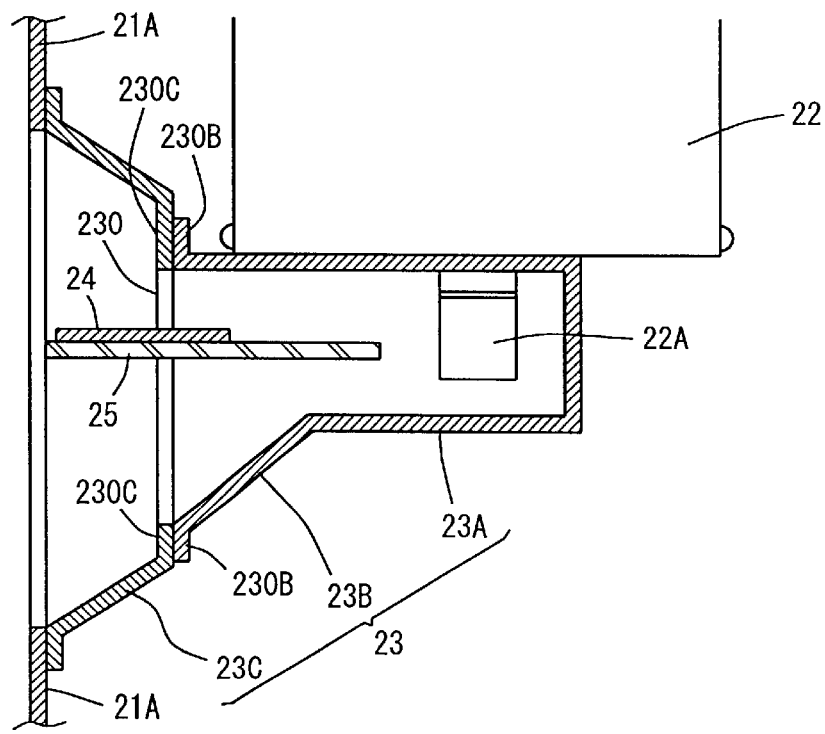

The microwave oven according to the present embodiment shown in FIG. 3 is formed by further providing an antenna 24 and the like to the microwave oven according to the second embodiment. The components that are present in both the microwave ovens shown in FIG. 2 and FIG. 3 are denoted by the same reference characters, and the descriptions thereof are not repeated here.

Figure 4:
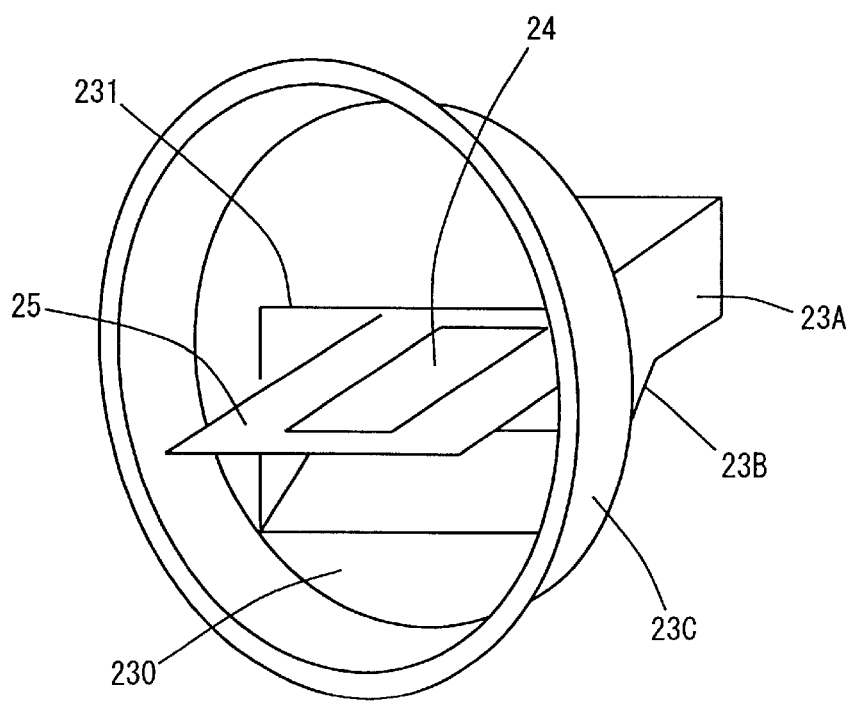
FIG. 4 is a perspective view of the wave guide in FIG. 3.

As shown in FIG. 3, in the microwave oven according to the present embodiment, an antenna 24 made of metal is provided such that it connects the internal spaces of matching portions 23B and 23C. Antenna 24 is placed on a support board 25. Support board 25 may be formed by a material having a low dielectric constant, such as a mica board. The manner in which antenna 24 is set up will be described in relation to FIGS. 4 and 5. FIG. 4 presents a view with matching portion 23C side in the front.

Figure 5:
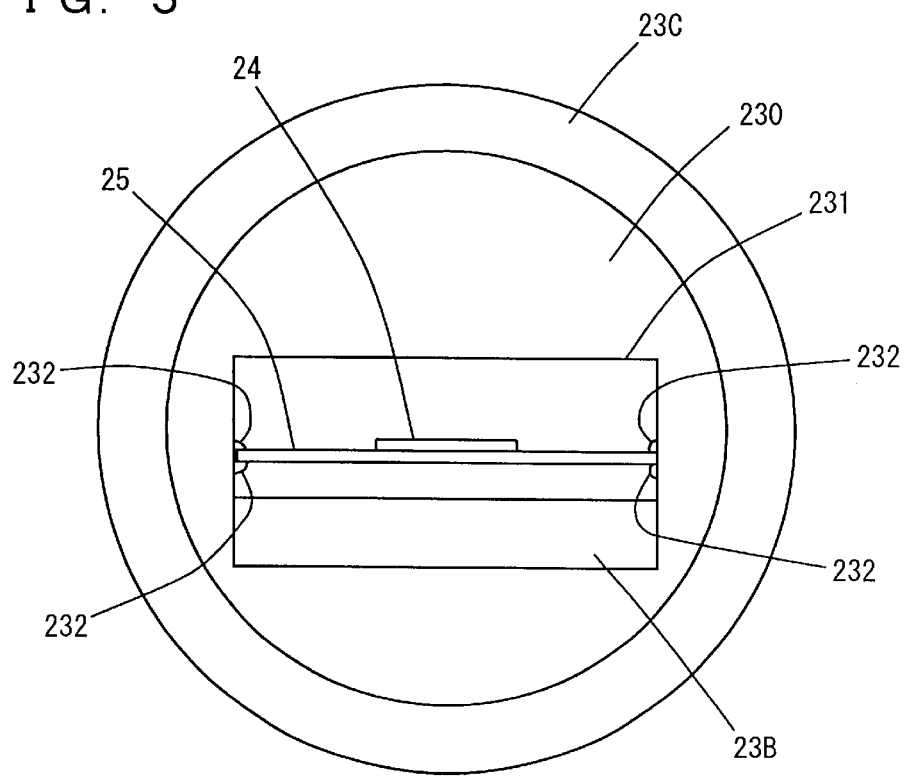
FIG. 5 is a front view of the wave guide in FIG. 3.

As shown in FIGS. 3 to 5, wave guide 23 is provided with a dividing plate 230 in the portion where matching portions 23B and 23C are connected. Dividing plate 230 has an opening 231 substantially in the central portion of dividing plate 230, and on either side wall surface to the right and to the left of opening 231, holding rails 232 are formed for holding support board 25. Support board 25 has its both right and left ends fitted into holding rails 232 so that support board 25 is provided in such a way that it makes no contact with combining portion 23A and matching portions 23B and 23C within wave guide 23.

Antenna 24 has a board-like structure. The main surface of antenna 24 is smaller than the main surface of support board 25. Antenna 24 is placed on support board 25. Antenna 24 is attached to support board 25 by an adhesive commonly used. Thus, antenna 24 is supported by support board 25 without making contact with combining portion 23A and matching portions 23B and 23C within wave guide 23.

As shown in FIG. 3, a connecting portion 230B between matching portions 23B and 23C, and a connecting portion 230C between matching portions 23C and 23B each have a structure that is bent in the vertical direction. Seen from the horizontal direction, the rate of change in cross-sectional area in planes parallel to the depth-wise direction and to the vertical direction of the drawing is substantially constant in each of matching portions 23B and 23C. The rate of change in cross-sectional area in the vertical cross section referred to herein signifies the amount of change in the cross-sectional areas in planes parallel to the depth-wise direction and to the vertical direction of the drawing. In the portion connecting matching portions 23B and 23C, however, seen from the horizontal direction, the rate of change in cross-sectional area in planes parallel to the depth-wise direction and to the vertical direction of the drawing undergoes a change when compared with its vicinities. When such a portion exist within wave guide 23, it becomes difficult to effect the impedance matching between combining portion 23A and the heating chamber.

Therefore, antenna 24 is provided in the portion connecting matching portions 23B and 23C in the present embodiment so that the impedance matching can be effected between matching portions 23B and 23C with greater certainty, which leads to the impedance matching between the high frequency heating portion and the heating chamber being effected with greater certainty. Thus, in the present embodiment, antenna 24 is the metal antenna provided at the portion where the rate of change in cross-sectional area of the wave guide in the direction of microwave propagation changes. Further, antenna 24 is provided within the wave guide.

Furthermore, in the present embodiment, antenna 24 is provided such that it does not make contact with combining portion 23A and matching portions 23B and 23C which are the body portion of wave guide 23. As a result, the impedance matching between matching portions 23B and 23C can be effected with greater certainty.

Fourth Embodiment

Figure 6:
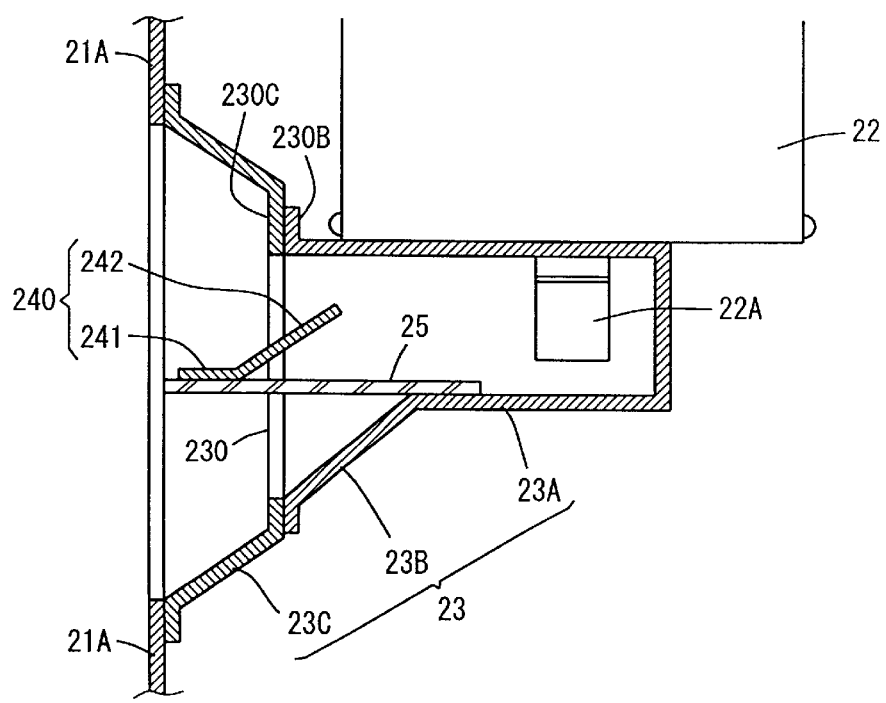
FIGS. 6 and 7A are diagrams showing the magnetrons and wave guides in microwave ovens of fourth and fifth embodiments of the present invention, respectively.

The microwave oven according to the present embodiment shown in FIG. 6 has an antenna 240 provided to the microwave oven according to the third embodiment in place of antenna 24. Antenna 240 is made by modifying the shape of antenna 24. The components that are present in both the microwave ovens shown in FIG. 3 and FIG. 6 are denoted by the same reference characters, and the descriptions thereof are not repeated here.

Antenna 240 in the microwave oven according to the present embodiment has a horizontal portion 241 that extends in the horizontal direction and a bent portion 242 that is bent in relation to horizontal portion 241. Bent portion 242 is located in a position corresponding to the portion connecting matching portions 23B and 23C when seen in the vertical direction. Thus, the impedance matching can be effected with greater certainty in the microwave oven according the present embodiment than in the microwave oven shown in FIG. 3.

Further, in the present embodiment, antenna 240 is the metal antenna provided at the portion, within the wave guide, where the rate of change in cross-sectional area of the wave guide in the direction of microwave propagation changes. Moreover, horizontal portion 241 is the portion conforming to the direction of microwave propagation, and bent portion 242 is the portion crossing the direction of microwave propagation.

Fifth Embodiment

Figure 7A:
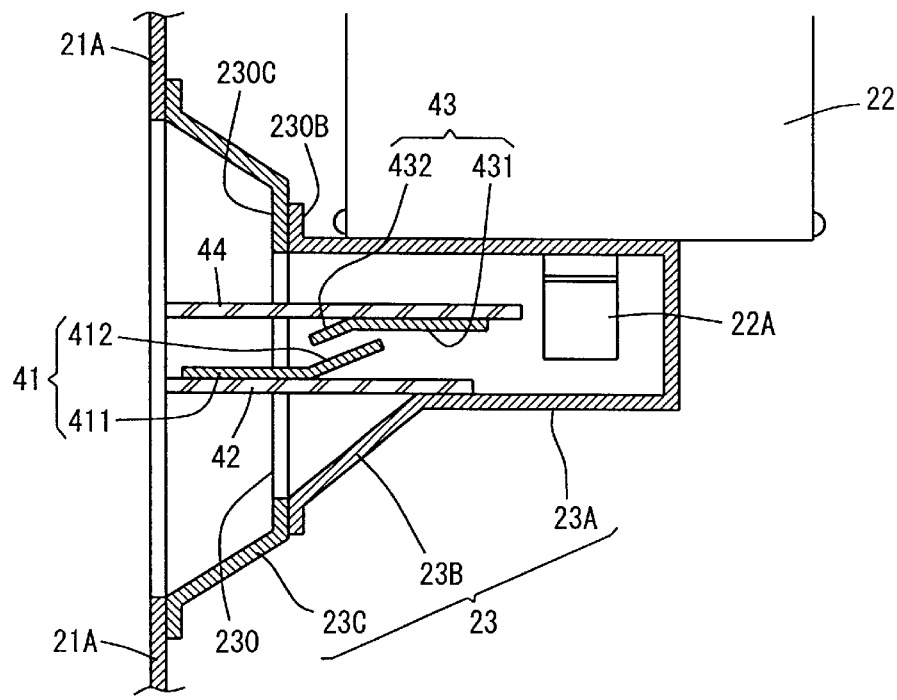

The microwave oven according to the present embodiment shown in FIG. 7A has antennas 41 and 43 and support boards 42 and 44 provided to the microwave oven according to the third embodiment in place of antenna 24 and support board 25. The components that are present in both the microwave ovens shown in FIG. 3 and FIG. 7A are denoted by the same reference characters, and the descriptions thereof are not repeated here.

The microwave oven according to the present embodiment is provided with two antennas 41 and 43. Antennas 41 and 43 are respectively provided on support boards 42 and 44 in a manner similar to the manner in which antenna 24 and support board 25 are provided to wave guide 23. The manner in which antenna 24 and support board 25 is provided to wave guide 23 has been described above in relation to FIGS. 3 to 5.

Antennas 41 and 43 respectively include horizontal portions 411 and 431 that extend in the horizontal direction and bent portions 412 and 432 that are bent in relation to horizontal portions 411 and 431. Antenna 41 is located in a position corresponding to the portion connecting matching portions 23B and 23C when seen in the perpendicular direction (i. e. the vertical direction in FIG. 7A). Antenna 43 is located in a position corresponding to the portion connecting combining portion 23A and matching portion 23B when seen in the perpendicular direction (i. e. the vertical direction in FIG. 7A). As seen in FIG. 7A, the portion connecting combining portion 23A and matching portion 23B and the portion connecting matching portions 23B and 23C are both portions in which the rate of change in cross-sectional area in planes parallel to the depth-wise direction and to the vertical direction of the drawing (i. e. in the vertical cross section of wave guide 23) undergoes a change when compared with its vicinities. Thus, all the portions in which the rate of change in cross-sectional area of the wave guide in the direction of microwave propagation changes are connected by antenna 41 or antenna 43 in the microwave oven according to the present embodiment. As a result, the impedance matching between combining portion 23A and the heating chamber can be effected with greater certainty.

Figure 7B:
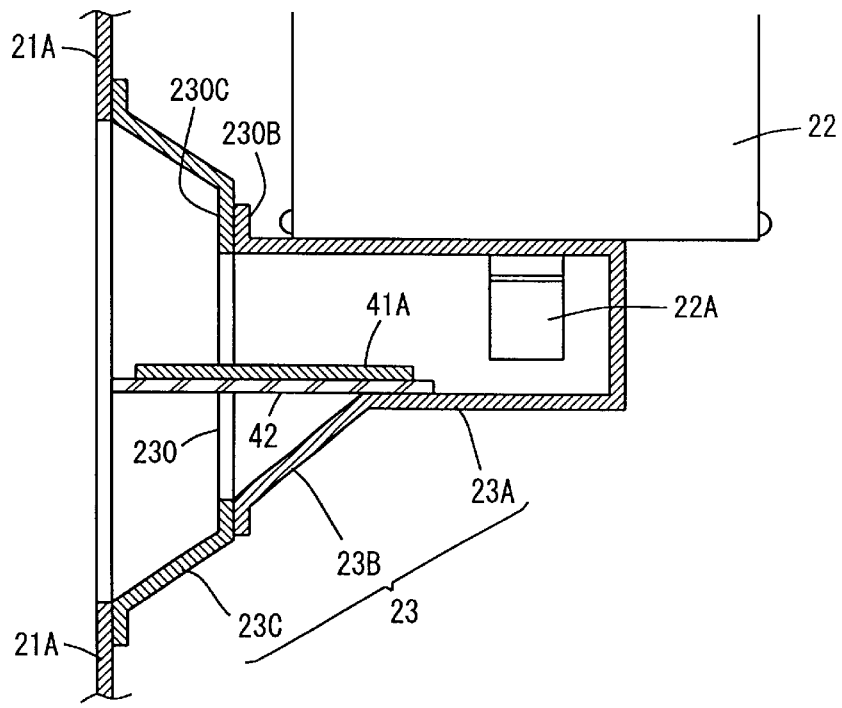
FIG. 7B is a diagram showing a magnetron and a wave guide in a variation of a microwave oven of a fifth embodiment of the present invention.

Preferably, the portions in which the rate of change in cross-sectional area of wave guide 23 in the direction of microwave propagation changes are connected by a single antenna in the microwave oven according to the present embodiment, as shown in FIG. 7B. In other words, it is preferable to form antennas 41 and 43 of FIG. 7A as an antenna 41A of FIG. 7B in an integrated form in the present embodiment so that the impedance matching between combining portion 23A and the heating chamber can be effected with greater certainty.

Figure 7C:
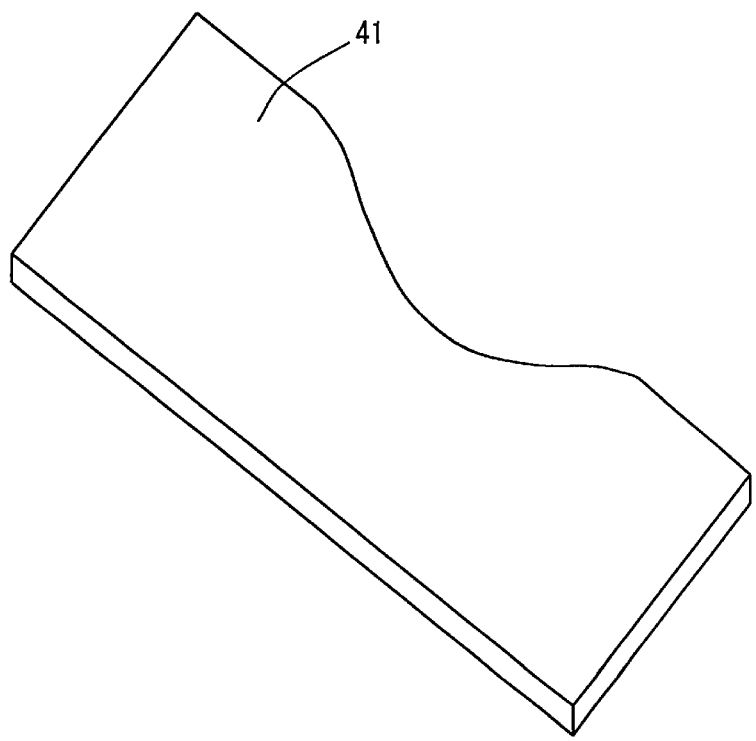
FIG. 7C is a perspective view of an antenna of another variation of a microwave oven of the fifth embodiment of the present invention.

Moreover, each of antennas 41 and 43 may be formed in a rod-like shape or in a board-like shape. When formed in a rod-like shape, each of antennas 41 and 43 is preferably formed such that the cross-sectional area changes. When formed in a board-like shape, each of antennas 41 and 43 is preferably formed such that the cross-sectional area, i. e., the width of the main surface, changes, as shown in FIG. 7C. Thus, antennas 41 and 43 may be formed to effect the impedance matching between combining portion 23A and the heating chamber in a more suitable manner.

Further, antennas 41 and 43 are preferably provided respectively in the positions corresponding to the portion connecting matching portions 23B and 23C and the portion connecting combining portion 23A and matching portion 23B when seen in the perpendicular direction (i. e. the vertical direction in FIG. 7A) as described above. In addition, preferably, at least one antenna is found in the horizontal direction (i. e. the lateral direction in FIG. 7A) in every region from the position where magnetron antenna 22A exists to the heating chamber. This condition is shown schematically in FIG. 8.

Figure 8:
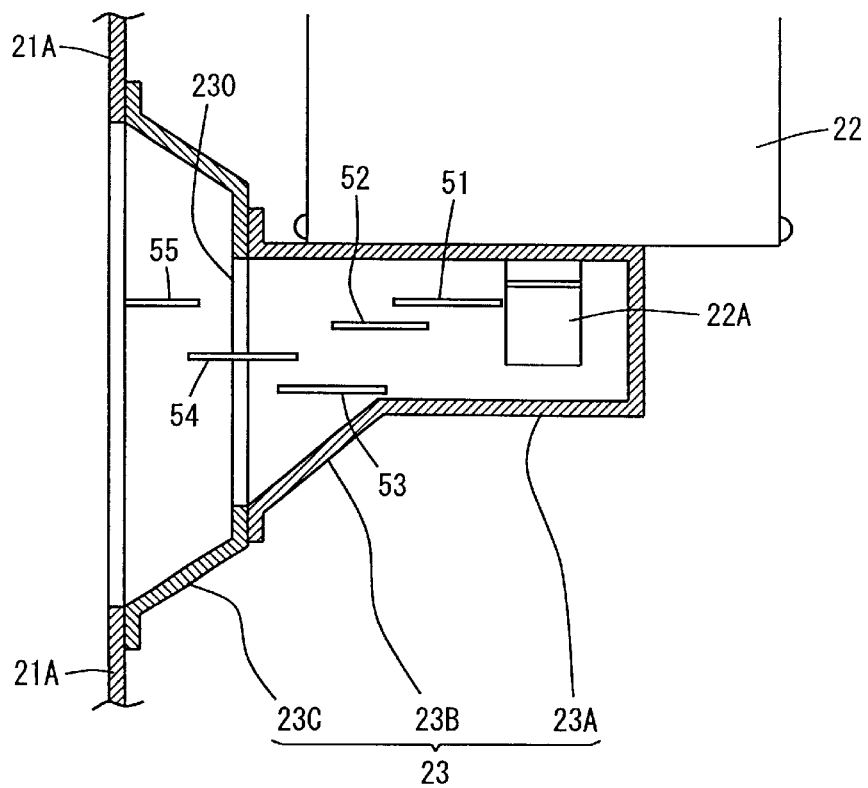
FIG. 8 is a diagram related to a description of a still another variation of a microwave oven of the fifth embodiment of the present invention.

As shown in FIG. 8, five antennas, antennas 51 to 55, exist in the space starting from the position where magnetron antenna 22A resides within wave guide 23 to side surface 21A of the heating chamber. Antennas 51 to 55 are arranged such that one of antennas 51 to 55 resides in every vertical cross section in the space starting from the position where magnetron antenna 22A resides to side surface 21A of the heating chamber. Here, a vertical cross section refers to a plane of cross section parallel to the depth-wise direction and to the vertical direction of the drawing. With antennas being arranged thus in wave guide 23, the continuous space starting from the position where magnetron antenna 22A resides to side surface 21A of the heating chamber is coupled in relation to the microwaves in the direction of microwave propagation. Thus, the impedance matching between combining portion 23A and the heating chamber can be effected with greater certainty. Thus, with the variation described in relation to FIG. 8, the fact that an antenna exists in every plane perpendicular to the direction of microwave propagation in the wave guide is disclosed. Here, the direction of microwave propagation refers to the direction going from the right toward the left of the drawing.

In the variation described in relation to FIG. 8, antennas 51 to 55 need not be all on the same plane with regard to the plane parallel to the horizontal direction which is also a vertical cross section, i. e. the plane parallel to the sheet of the drawing.

The arrangement of antennas 51 to 55 described above in relation to FIG. 8 implies the fact that an antenna exists in every plane that crosses the direction of microwave propagation in the wave guide of the microwave oven.

Comparison of Heating Capabilities

The effects of each of the embodiments will be described below with reference to the indicated results of heating using the microwave oven according to each of the above-described embodiments.

Two litters of water and an amount of sake respectively were heated using five kinds of microwave ovens. Table 1 shows the ratio of the microwaves used for the actual heating to the microwaves output by the magnetron when heating two litters of water in each of the microwave ovens (see "Energy Absorbed by Two Litters of Water/Energy Applied to Magnetron" in Table 1). This ratio is a representation in percentage of the result calculated by a/b where a is the amount of microwaves absorbed by two litters of water and b is the amount of energy applied to the magnetron. It may be concluded that the greater the value of this ratio is, the smaller the amount of reflected microwaves.

In addition, Table 1 shows the temperature difference of sake in a tokkuri (sake bottle) in the upper portion and in the lower portion of the tokkuri when sake in the tokkuri is heated by each of the microwave ovens (see "Temperature Difference between Upper and Lower Portions" in Table Moreover, Table 1 indicates the heating results of the five kinds of microwave ovens, No. 1 through No. 5. Here, microwave oven No. 1 refers to the microwave oven shown in FIG. 2.

Figure 9:
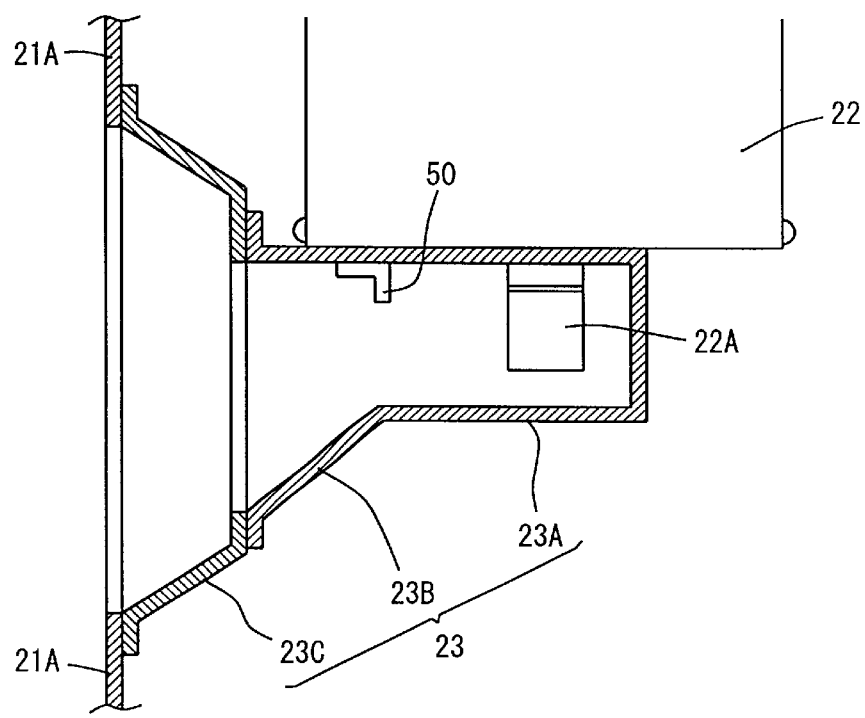
FIGS. 9 and 10 are diagrams showing variations of a microwave oven according to the present invention.

Microwave oven No. 2 is a microwave oven, as shown in FIG. 9, that has a reflection board 50 further provided within wave guide 23 of the microwave oven shown in FIG. 2. Reflection board 50 is formed of two parts perpendicular to one another, and one of the two parts is connected to an upper surface of wave guide 23, while the other is positioned such that it extends downward within wave guide 23. In addition, the other of the two parts of reflection board 50 is located in the portion connecting combining portion 23A and matching portion 23B.

Microwave oven No. 3 is a microwave oven, as shown in FIG. 3, that has a board-like antenna 24 provided within wave guide 23 of the microwave oven shown in FIG. 2.

Microwave oven No. 4 is a microwave oven, as shown in FIG. 6, in which antenna 24 of the microwave oven shown in FIG. 3 is bent upward in relation to support board 25.

Figure 10:
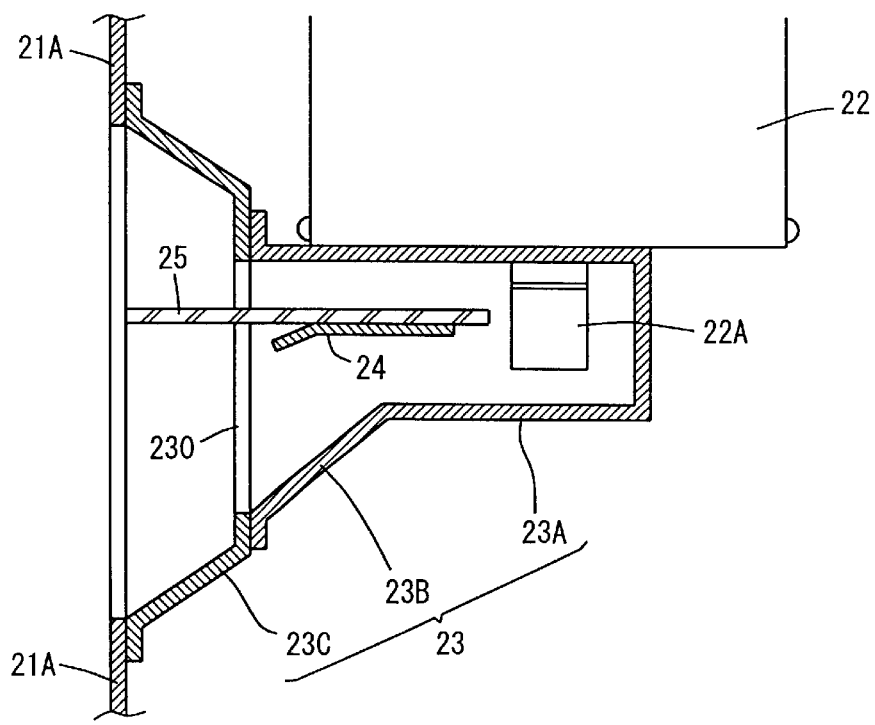

Microwave oven No. 5 is a microwave oven, as shown in FIG. 10, in which antenna 24 of the microwave oven shown in FIG. 3 is bent downward in relation to support board 25.

TABLE 1

| No. | Reference | Notes | Energy Absorbed by Two Litters of Water/Energy Applied to Magnetron | Temperature Difference between Upper and Lower Portions (° C.) |
|---|---|---|---|---|
| 1 | FIG. 2 | — | 66.1% | 16.8 |
| 2 | FIG. 9 | FIG. 2 + Reflection Board | 68.3% | 21.0 |
| 3 | FIG. 3 | Board-Like Horizontal Antenna | 67.4% | 30.9 |
| 4 | FIG. 6 | Bent Antenna | 70.4% | 8.3 |
| 5 | FIG. 10 | Bent Antenna | 69.9% | 19.0 |

First, observations will be made with regard to the ratio of the microwaves used for the actual heating to the microwaves output by the magnetron in relation to Table 1 (see "Energy Absorbed by Two Litters of Water/Energy Applied to Magnetron" in Table 1).

The comparison between microwave ovens No. 1 and No. 2 indicates that the ratio of the microwaves used for the actual heating in microwave oven No. 2 is greater by 2.2%. It is thus noted that the provision of reflection board 50 better effects the impedance matching between the heating chamber and the region in which a magnetron antenna exists.

The comparison between microwave ovens No. 1 and No. 3 indicates that the ratio of the microwaves used for the actual heating in microwave oven No. 3 is greater by 1.3%. It is thus noted that the provision of antenna 24 better effects the impedance matching between the heating chamber and the region in which the magnetron antenna exists.

Similarly, the comparisons among microwave ovens No. 3, No. 4, and No. 5 indicate that the ratio of the microwaves used for the actual heating in microwave oven No. 4 is greater than that in microwave oven No. 3 by 2.5%, while that in microwave oven No. 5 is greater than that in microwave oven No. 3 by 3.0%. It is thus noted that the bending of antenna 24 better effects the impedance matching between the heating chamber and the region in which the magnetron antenna exists.

Next, observations will be made with regard to the temperature difference of sake in a tokkuri in the upper portion and in the lower portion of the tokkuri when sake in the tokkuri is heated (see "Temperature Difference between Upper and Lower Portions" in Table 1). This temperature difference can be considered to be a measure of unevenness of heating in the microwave oven.

The comparison between microwave ovens No. 1 and No. 3 indicates that the temperature difference of sake in the upper portion and in the lower portion in microwave oven No. 3 is greater by 4.1° C. It is thus noted that the provision of antenna 24 aggravates the unevenness of heating in the microwave oven; that is, the unevenness of heating becomes more obvious.

The comparisons among microwave ovens No. 3, No. 4, and No. 5, however, indicate that the temperature difference of sake in the upper portion and in the lower portion in microwave oven No. 4 is smaller than that in microwave oven No. 3 by 11.9° C., while that in microwave oven No. 5 is smaller than that in microwave oven No. 3 by 22.6° C. Moreover, the comparison between microwave ovens No. 1 and No. 5 indicates that the temperature difference in microwave oven No. 5 is smaller than that in microwave oven No. 1 by 8.5° C. It is thus noted that the bending of antenna 24 limits the unevenness of heating.

Sixth Embodiment

Now, the receiving base as a component of a microwave oven according to the present embodiment will be described below.

Figure 11A:
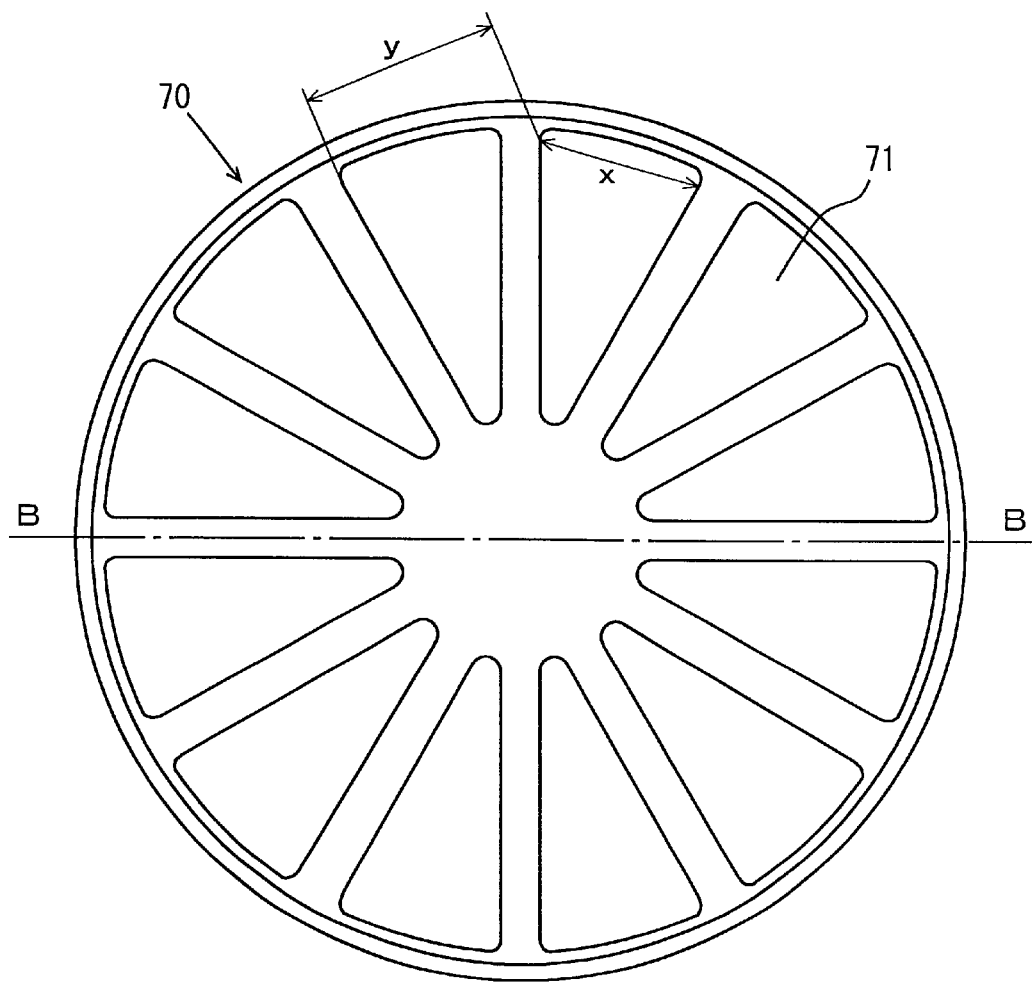
FIG. 11A is a plan view of a receiving base that holds a turntable of a sixth embodiment of the present invention.
Figure 11B:
FIG. 11B is a cross sectional view taken along the line B—B in FIG. 11A.
Figure 12:
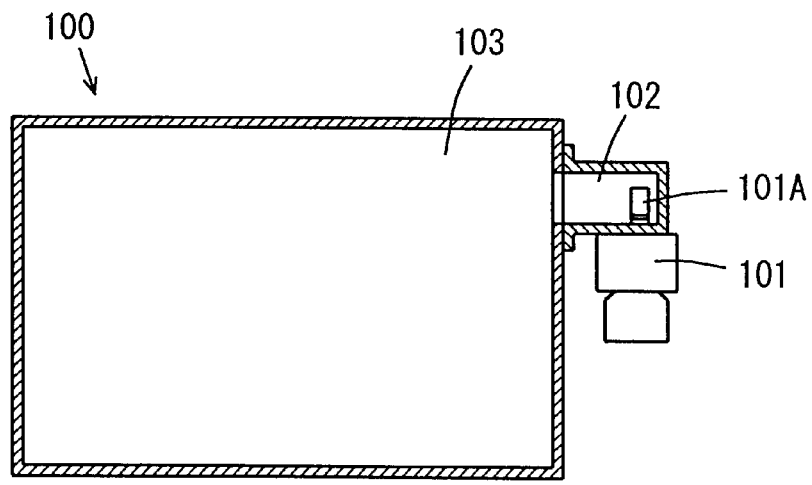
FIGS. 12 to 14 are diagrams representing first to third examples of prior art in relation to the present invention.
Figure 13:
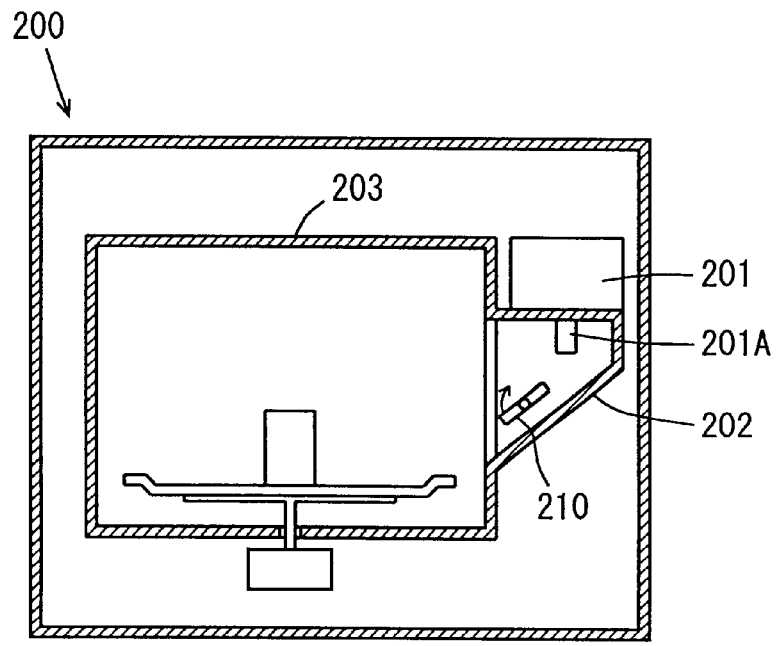
Figure 14:
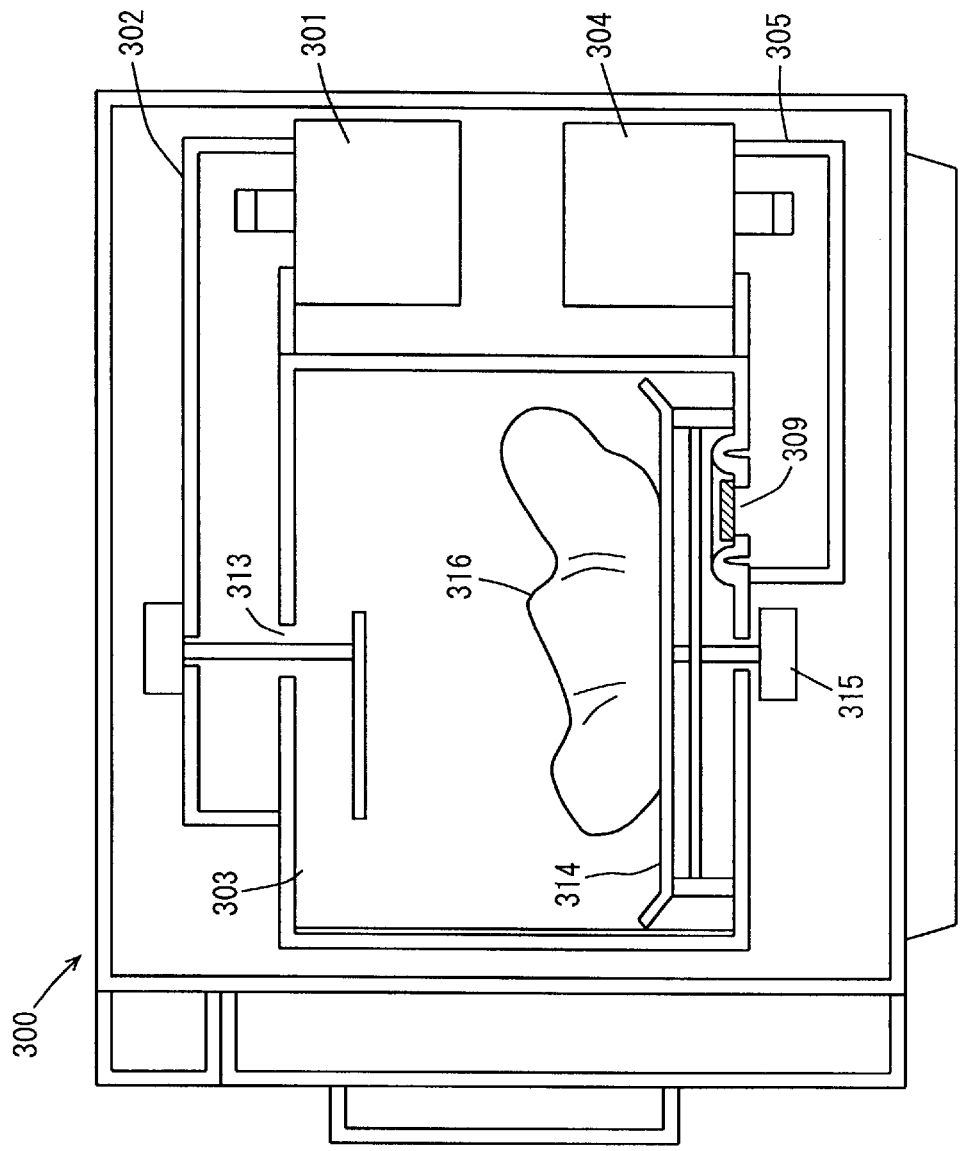

As described in relation to the third prior art example, a turntable is made of a microwave-permeable material such as glass and is held by a metallic receiving base. FIG. 11 is a diagram showing the metallic receiving base according to the present embodiment. FIG. 11A is a plan view of the receiving base, and FIG. 11B is a cross sectional view taken along the line B—B in FIG. 11A.

As shown in FIG. 11, receiving base 70 has a circular shape. Receiving base 70 has twelve windows 71 formed such that they spread radially from the center toward the outer periphery. In other words, twelve holes of substantially fan-like shapes whose arcs are directed toward the outer periphery are formed as windows 71 in receiving base 70.

Preferably, the chord length (x in FIG. 11A) of each of the fan-shapes (substantially fan-like shapes) forming windows 71 is 5 centimeters at most for the reason given below.

Normally, among the dishes and containers used for heating in a microwave oven, one example of container that has the smallest base area is a tokkuri. In general, the minimum value of the diameter of a tokkuri would be 5 centimeters.

On the other hand, when the microwaves are supplied toward the bottom surface of the heating chamber, since metallic receiving base 70 is provided in the base portion of the turntable and metal reflects the microwaves, there exist on the turntable a region to which the microwaves are supplied from below and a region to which no microwave is supplied.

With receiving base 70 according to the present embodiment, if the above-described "x" is set to be smaller than or equal to 5 centimeters, when a food is placed on the turntable but not in the center of the turntable, the food held on or in a dish or a container of any size would be placed such that it covers both the region to which the microwaves are supplied from below and the region to which no microwave is supplied. For the same reason, it is even more preferable to set the spacing (y in FIG. 11A) between adjacent windows 71 in the portion closest to the circumference of receiving base 70 to be smaller than or equal to 5 centimeters. It can be said that y in FIG. 11A is the one-line distance between the points corresponding to adjacent windows 71 of the same shape.

It may be understood that, by configuring receiving base 70 as described in the present embodiment, the amount of microwaves absorbed from the bottom surface of food in relation to the heating time in the microwave oven becomes proportional to the base area of the food. In other words, the stable heating capabilities in relation to the base area of food is achieved. As a result, a user may place a plurality of foods in arbitrary positions on concentric circles and still effect the uniform heating of the foods.

In the present embodiment, receiving base 70 forms the receiving base that is formed of metal and that supports and drives a heating plate. Normally, the heating plate made of glass is placed on receiving base 70, and food as the object to be heated is placed on this glass plate.

Moreover, since the above-described "x" is smaller than or equal to 5 centimeters, the maximum value of the dimension of a window of the receiving base in a direction perpendicular to the radial direction of the receiving base is set to be 5 centimeters in the present embodiment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A high frequency heating apparatus, comprising:

a heating chamber for accommodating an object to be heated;

high frequency heating means for generating microwaves to heat said object to be heated;

a wave guide for introducing into said heating chamber the microwaves generated by said high frequency heating means, said wave guide including a first portion having one end connected to said high frequency heating means and in which impedance with regard to microwave propagation does not change, and a second portion connected to an other end of said first portion and to said heating chamber and in which impedance with regard to microwave propagation changes from impedance close to that of said first portion to impedance close to that of said heating chamber; and a metal antenna provided in every portion, in said wave guide, where rate of change in cross-sectional area of said wave guide in a direction of microwave propagation changes.

2. The high frequency heating apparatus according to claim 1, wherein said antenna is formed with a single piece of metal.

3. A high frequency heating apparatus, comprising:

a heating chamber for accommodating an object to be heated;

high frequency heating means for generating microwaves to heat said object to be heated;

a wave guide for introducing into said heating chamber the microwaves generated by said high frequency heating means, said wave guide including a first portion having one end connected to said high frequency heating means and in which impedance with regard to microwave propagation does not change, and a second portion connected to an other end of said first portion and to said heating chamber and in which impedance with regard to microwave propagation changes from impedance close to that of said first portion to impedance close to that of said heating chamber; and a metal antenna provided at a portion, in said wave guide, where rate of change in cross-sectional area of said wave guide in a direction of microwave propagation changes, said antenna having a portion conforming to the direction of microwave propagation and a portion crossing the direction of microwave propagation.

4. A high frequency heating apparatus, comprising:

a heating chamber for accommodating an object to be heated;

high frequency heating means for generating microwaves to heat said object to be heated;

a wave guide for introducing into said heating chamber the microwaves generated by said high frequency heating means, said wave guide including a first portion having one end connected to said high frequency heating means and in which impedance with regard to microwave propagation does not change, and a second portion connected to an other end of said first portion and to said heating chamber and in which impedance with regard to microwave propagation changes from impedance close to that of said first portion to impedance close to that of said heating chamber; and a metal antenna provided at a portion, in said wave guide, where rate of change in cross-sectional area of said wave guide in a direction of microwave propagation changes, said antenna being present in every plane crossing the direction of microwave propagation in said wave guide.

5. A high frequency heating apparatus, comprising:

a heating chamber for accommodating an object to be heated;

high frequency heating means for generating microwaves to heat said object to be heated;

a wave guide for introducing into said heating chamber the microwaves generated by said high frequency heating means, said wave guide including a first portion having one end connected to said high frequency heating means and in which impedance with regard to microwave propagation does not change, and a second portion connected to an other end of said first portion and to said heating chamber and in which impedance with regard to microwave propagation changes from impedance close to that of said first portion to impedance close to that of said heating chamber; and a metal antenna provided at a portion, in said wave guide, where rate of change in cross-sectional area of said wave guide in a direction of microwave propagation changes.

6. The high frequency heating apparatus according to claim 5, wherein said antenna is mounted such that it avoids contact with said wave guide.

7. The high frequency heating apparatus according to claim 5, wherein said antenna has a portion where its cross-sectional area changes.

8. A high frequency heating apparatus, comprising:

a heating chamber for accommodating an object to be heated;

high frequency heating means for generating microwaves to heat said object to be heated; and a wave guide for introducing into said heating chamber the microwaves generated by said high frequency heating means, said wave guide including a first portion having one end connected to said high frequency heating means and in which impedance with regard to microwave propagation does not change, a second portion connected to an other end of said first portion and directly to said heating chamber, with a portion of said second portion connected to said chamber having a tapered shape, and in which impedance with regard to microwave propagation changes from impedance close to that of said first portion to impedance close to that of said heating chamber; and a metal antenna provided at a portion, in said wave guide, where rate of change in cross-sectional area of said wave guide in a direction of microwave propagation changes.

9. The high frequency heating apparatus according to claim 8, wherein said antenna is provided in every portion in which the rate of change in cross-sectional area of said wave guide in the direction of microwave propagation changes.

10. The high frequency heating apparatus according to claim 8, wherein said antenna has a portion conforming to the direction of microwave propagation and a portion crossing the direction of microwave propagation.

11. The high frequency heating apparatus according to claim 8, wherein said antenna is present in every plane crossing the direction of microwave propagation in said wave guide.

* * * * *